United States Patent [19]
Ohara et al.

[11] Patent Number: 4,908,401
[45] Date of Patent: Mar. 13, 1990

[54] RUBBER COMPOSITION FOR TIRE TREAD

[75] Inventors: Riichiro Ohara, Suita; Satoshi Iwama, Ibaraki; Eiji Ida, Takatsuki; Noriyuki Isobe, Ibaraki, all of Japan

[73] Assignee: Toyo Tire & Rubber Company Limited, Osaka, Japan

[21] Appl. No.: 287,257

[22] Filed: Dec. 21, 1988

Related U.S. Application Data

[63] Continuation-in-part of Ser. No. 925,211, Oct. 31, 1986, abandoned.

[30] Foreign Application Priority Data

Nov. 9, 1985 [JP] Japan ................... 60-251783

[51] Int. Cl.$^4$ ............ C08K 3/04; C08L 7/00; C08L 9/00; C08L 53/02
[52] U.S. Cl. .................. 524/495; 524/496; 524/505
[58] Field of Search ............ 524/495, 496, 505; 152/209 R

[56] References Cited

U.S. PATENT DOCUMENTS

| | | | |
|---|---|---|---|
| 3,393,182 | 7/1968 | Trepka | 260/79.05 |
| 4,334,567 | 6/1982 | Bond | 152/209 R |
| 4,398,582 | 8/1983 | Yuto et al. | 524/495 |
| 4,548,980 | 10/1985 | Nagata et al. | 324/495 |
| 4,550,135 | 10/1985 | Iwama et al. | 524/505 |

FOREIGN PATENT DOCUMENTS 57-102933  7/1982  Japan ................... 524/505

Primary Examiner—Allan M. Lieberman
Attorney, Agent, or Firm—Armstrong, Nikaido, Marmelstein, Kubovcik & Murray

[57] ABSTRACT

A rubber composition comprising 40 to 100 parts by weight of carbon black per 100 parts by weight of a rubber component,
(a) the rubber composition being characterized in that the rubber component contains, in 100 parts by weight thereof, at least 20 parts by weight of a block copolymer prepared by solution polymerization and comprising one unit of butadiene rubber portion and one unit of random-copolymerized styrene-butadiene rubber portion, the butadiene rubber portion having a vinyl content of 15 to 50%, the styrene-butadiene rubber portion having a vinyl content of 20 to 70% and a styrene content of 30 to 60%, the block copolymer having in its entirety a vinyl content of 15 to 60% and a styrene content of 5 to 30% at least 40% of the copolymer being coupled with a tin compound so that the coupled copolymer has a butadiene rubber terminal, the coupled copolymer having only a single Tg at a temperature of up to $-60°$ C., 0 to 80 parts by weight of natural rubber, synthetic polyisoprene rubber, synthetic polybutadiene rubber, synthetic styrene-butadiene rubber, modified products of thers rubbers, or mixtures thereof;
(b) the rubber composition being further characterized in that the carbon black has a specific surface area value ($N_2SA$) withinthe range of 75 ot 105 as determiend by the nitrogen adsorption method and is at least 15 in the difference between $N_2SA$ and the iodine adsorption value (IA) thereof, up to 5 in the difference between $N_2SA$ and the specific surface area valve (CTAB) thereof as determined by the cetyltrimethylammonium bromide adsorption method, 90 to 110 in tint strength and up to $-3$ in the measured tint strength minus the calculated tint stength ($\Delta$tint).

5 Claims, No Drawings

RUBBER COMPOSITION FOR TIRE TREAD

CROSS-REFERENCED TO RELATED APPLICATION

This application is a continuation-in-part of application Ser. No. 925,211, filed Oct. 31, 1986, now abandoned.

The present invention relates to a rubber composition suitable for tire treads.

Recently, it has been strongly desired to provide a rubber material for motor vehicle tire treads which has low rolling resistance and great wet skid resistance to fulfill the requirement of low fuel cost for motor vehicles and to assure safety during running. However, these characteristics are in conflict with each other. Moreover, a single rubber is unable to satisfy these characteristics and friction characteristics at the same time. To assure such characteristics in good balance, therefore, blend compositions of different kinds of rubbers have been used. The rubber materials heretofore used for motor vehicle tire treads include, for example, a blend composition comprising a styrene-butadiene copolymer rubber (SBR) having relatively great wet skid resistance and containing 10 to 30 wt. % of styrene content and up to 20% of vinyl content, and a polybutadiene rubber (BR) having small rolling resistance and good abrasion resistance and containing up to 20% of vinyl content. This composition nevertheless fails to fully exhibit the features of the two rubber components and still remains to be improved in wet skid resistance and rolling resistance.

For improvements in wet skid resistance and rolling resistance, attempts to improve SBR and BR have been made in recent years chiefly with use of organolithium initiators. For example, a rubber composition is proposed which comprises a BR having a high vinyl content to achieve this purpose (British Pat. No. 1,165,832). The BR with a high vinyl content is favorable in assuring balance between wet skid resistance and rolling resistance, but is very poor in braking characteristics and abrasion resistance and is therefore difficult to use simply. To afford improved braking characteristics and abrasion characteristics, a blend of BR and a diene rubber such as NR (natural rubber), high-cis BR or emulsion-polymerized SBR is proposed. However, the blend composition has the drawback of failing to give wet skid resistance in balance with braking characteristics and abrasion resistance when comprising NR or high-cis BR, or being poor in rolling resistance when comprising SBR.

Unexamined Japanese Patent Publication SHO 54-62248 proposes use of a random SBR containing 20 to 40 wt. % of bonded styrene and a butadiene portion with a relatively high vinyl bond content to give improved wet skid resistance and rolling resistance. To be sure, the SBR is improved over the conventional emulsion-polymerized SBR and the conventional SBR prepared using an organolithium initiator in respect of balance between wet skid resistance, rolling resistance and abrasion resistance, but the material is still unsatisfactory and needs to be as blended with another diene rubber. However, like high-vinyl BR, the SBR is still unsatisfactory in balance between wet skid resistance, rolling resistance, braking characteristics and abrasion characteristics even if blended with any other rubber.

Unexamined Japanese Patent Publications SHO 57-109,817 and SHO 57-109,818 disclose styrene-butadiene block copolymers comprising random copolymer blocks which are different in styrene content and vinyl bond content, as rubber materials which have good balance between wet skid resistance, rolling resistance, abrasion characteristics, etc. The blocks of these copolymers contain styrene and vinyl bonds in amounts within specified ranges. However, communities set forth safety and low fuel cost requirements for tires with increasing severity, and the tires obtained with use of the block copolymer singly or as blended with a different rubber still remain to be improved in abrasion characteristics and braking characteristics.

An object of the present invention is to provide a rubber composition for tire treads comprising a specified rubber component and carbon black of specified properties in combination and having good balance between abrasion characteristics, rolling resistance (RR), wet skid resistance (wet $\mu$) and braking characteristics.

The present invention provides a rubber composition comprising 40 to 100 parts by weight of carbon black per 100 parts by weight of a rubber component, (a) the rubber composition being characterized in that the rubber component contains, in 100 parts by weight thereof, at least 20 parts by weight of a block copolymer prepared by solution polymerization and comprising one unit of butadiene rubber portion and one unit of random-copolymerized styrene-butadiene rubber portion, the butadiene rubber portion having a vinyl content of 15 to 50%, the styrene-butadiene rubber portion having a vinyl content of 20 to 70% and a styrene content of 30 to 60%, the block copolymer having in its entirety a vinyl content of 15 to 60% and a styrene content of 5 to 30%, at least 40% of the copolymer being coupled with a tin compound so that the coupled copolymer has a butadiene rubber terminal, the coupled copolymer having only a single Tg at a temperature of up to $-60°$ C., 0 to 80 parts by weight of natural rubber, synthetic polyisoprene rubber, synthetic polybutadiene rubber, synthetic styrene-butadiene rubber, modified products of these rubbers, or mixtures thereof;

(b) the rubber composition being further characterized in that the carbon black has a specific surface area value ($N_2SA$) within the range of 75 to 105 as determined by the nitrogen adsorption method and is at least 15 in the difference between $N_2SA$ and the iodine adsorption value (IA) thereof, up to 5 in the difference between $N_2SA$ and the specific surface area value (CTAB) thereof as determined by the cetyltrimethylammonium bromide adsorption method, 90 to 110 in tint strength and up to $-3$ in the measured tint strength minus the calculated tint strength ($\Delta$tint).

According to the present invention, it is required that the rubber component comprise in 100 parts (by weight, the same as hereinafter) thereof at least 20 parts, preferably 20 to 100 parts, more preferably 35 to 100 parts, of the above specified solution-polymerized block copolymer. When containing a smaller amount of the copolymer, the composition fails to provide a tread of excellent characteristics as contemplated.

The above block copolymer by solution polymerization is prepared, for example, by the following method.

In a hydrocarbon solvent, 1,3-butadiene is polymerized in the presence of an organolithium compound as a polymerization initiator, and a randomizer to form a butadiene block. Examples of useful randomizers are 1,4-dioxane, diethyl ether, ethylene glycol dimethyl ether, tetrahydrofuran or like ether compound and triethylamine, tripropylamine or like amine compound.

When the conversion in the polymerization reaches to 95 to 100%, styrene and 1,3-butadiene are added in amounts of the monomer ratio in which the amount of butadiene is slightly less than that calculated from the monomer ratio and the polymerization is continued until the conversion reaches to 95 to 100%. Then the remainder of 1,3-butadiene is added. The mixture is further polymerized to obtain a styrene-butadiene block copolymer.

To the copolymer solution is added a coupling agent such as a halogen compound of tin or silicon to perform a coupling reaction. Then a solution of 2,6-di-tert.-butyl-4-methylphenol in methanol is added to terminate the polymerization. The solvent is removed to obtain a block copolymer used in the present invention.

It is suitable that the block copolymer be 15 to 50% in the vinyl content of the BR portion, 20 to 70% in the vinyl content of the SBR portion and 30 to 60% in the styrene content of the SBR portion. Further suitably, the copolymer has a vinyl content of 15 to 60% and a styrene content of 5 to 30% in its entirety. If these contents are less than the lower limits, a lower wet $\mu$, i.e. impaired wet skid resistance, will result, whereas if these values exceed the upper limits, impaired abrasion resistance and RR will result.

The copolymer is coupled with a tin compound so that the copolymer as coupled has a BR portion at the terminal. Examples of preferred tin compounds are halides, such as fluorides, chlorides, bromides and iodides, of Sn(II) and Sn(IV). The coupling efficiency is at least 40%, preferably 40 to 100%, more preferably 45 to 95%, most preferably 50 to 70%. When the efficiency is at least 40%, improved RR is available without impairing wet $\mu$. The coupling efficiency was determined using gel permeation chromatography (GPC), product of Waters, and 0.5 g/100 ml solution of the copolymer in tetrahydrofuran to prepare a molecular weight distribution graph, in which two peaks appeared, one for the coupled high-molecular-weight portion and the other for the unreacted low-molecular-weight portion. The efficiency was calculated from the ratio of the area of the former peak to the entire area. The Tg of the coupled copolymer was measured according to ASTM D3418 using a differential scanning calorimeter (DSC), product of Rigaku Denki Co., Ltd. According to the present invention, it is required that the coupled copolymer have only a single Tg at a temperature of up to $-60°$ C. If the Tg is in a temperature range higher than $-60°$ C., the copolymer is not desirable with respect to abrasion resistance and RR.

With the present invention, at least one of natural rubber (NR) and synthetic rubbers may be used as an ingredient of the rubber component other than the block copolymer. Examples of useful synthetic rubbers are polyisoprene rubber (IR), polybutadiene rubber (BR), styrene-butadiene rubber (SBR), modified products of such rubbers, blends of such rubbers, etc.

It is required that the carbon black to be used in the present invention be in the range of 75 to 105 in specific surface area value ($N_2SA$) as determined by the nitrogen adsorption method, at least 15 in the difference between this value and the iodine adsorption value (IA) thereof, up to 5 in the difference between the $N_2SA$ value and the specific surface area value (CTAB) thereof as determined by the cetyltrimethyl-ammonium bromide adsorption method, 90 to 110 in tint strength and up to $-3$ in $\Delta$tint obtained by subtracting the calculated tint strength thereof from the measured tint strength. When $N_2SA$ is less than 75, the composition has low abrasion resistance and is not suitable for tire treads. If it is over 105, increased RR will result. The greater the difference between $N_2SA$ and IA beyond 15, the greater is the surface activity of the carbon black. As the difference between $N_2SA$ and CTAB decreases especially in the range of up to 5, the number of micropores of the carbon black decreases. These properties result in variations in the interaction between the carbon black and the rubber, permitting the carbon black to act favorably when it is compounded with the rubber. The composition exhibits poor abrasion resistance if the tint strength is less than 90 or displays increased RR if it is over 110. When up to $-3$ in $\Delta$tint which is the measured tint strength minus the tint strength calculated from the following equation, the carbon black serves to reduce RR without decreasing wet $\mu$, exhibiting excellent properties.

$$\text{Calculated tint strength} = 56 + 1.057 \times (\text{CTAB}) - 0.002745 \times (\text{CTAB})^2 - 0.2596 \times (24M_4 \cdot \text{DBP}) - 0.201 \times (N_2SA - \text{CTAB})$$

wherein $24M_4 \cdot DBP$ represents the amount of absorbed dibutyl phthalate.

According to the present invention, it is desirable to use the carbon black in an amount of 40 to 100 parts, preferably 45 to 85 parts, per 100 parts of the rubber component.

The rubber composition of the present invention is prepared by mixing the foregoing components together by usual means such as rolls, Banbury mixer or kneader. It is of course possible to incorporate into the composition other known additives such as vulcanizing agent, vulcanization accelerator, auxiliary vulcanization accelerator, vulcanization retarder, organic peroxide, reinforcing agent, filler, antioxidant, tackifier, coloring agent, etc.

The present invention will be described in greater detail with reference to the following examples and comparative examples, in which the parts are by weight.

The Pico abrasion resistance index was determined according to ASTM D2228 using a Pico abrasion tester. The index is expressed relative to the result achieved in Comparative Example 7 which is taken as 100. The greater the value, the higher is the abrasion resistance.

The compositions of the examples as used for the tire tread were evaluated by preparing treads with use of each composition, producing tires of 185/70 SR14 size using the treads and testing the tires for wet skid resistance (wet $\mu$).

The resistance was measured according to UTQGS (American Tire Quality Grade Standards) of U.S. by installing the tires on a testing trailer using $5J \times 14$ rims, running the trailer on a wet asphalt pavement at a pneumatic pressure of 1.8 kg/cm$^2$ and under a load of 336 kg and measuring the abrasion resistance upon locking the tires during rotation. The resistance is expressed relative to the result achieved by Comparative Example 7 which is taken as 100. The greater the value, the higher is the resistance.

The RR of the tire was measured according to the standard of Society of Automotive Engineers, U.S., SAE J1269. The smaller the value, the better is the result.

REFERENCE EXAMPLE 1

Preparation of a block copolymer by solution polymerization

Into an autoclave equipped with a stirrer, after the air being replaced by nitrogen, were placed 500 parts of cyclohexane, 5 parts of tetrahydrofuran and 0.08 part of n-butyl lithium. The mixture was heated to 40° C. and thereto added 67 parts of 1,3-butadiene with stirring. After 60 minutes, thereto added 15 parts of 1,3-butadiene and 15 parts of styrene. The mixture was reacted for further 60 minutes and then 3 parts of 1,3-butadiene was added. After continuing the reaction for 40 minutes, 0.04 part of stannic chloride ($SnCl_4$) was added and the mixture was reacted for one hour to complete a coupling. Finally, to the mixture was added a solution of 2 g of 2,6-di-tert.-butyl-4-methylphenol in 100 g of methanol to terminate the polymerization. The solution was poured into hot water to precipitate the polymer. The solvent was removed by distillation and the residue was dried at a reduced pressure to obtain a polymer (Rubber component A).

EXAMPLES 1-2 AND COMPARATIVE EXAMPLES 1-7

The rubber component (100 parts) listed in Table 1, 55 parts of carbon black (a), 20 parts of oil, 3 parts of zinc white, 2 parts of stearic acid, 3 parts of antioxidant (p-phenylenediamine type), 1.5 parts of vulcanization accelerator (thiazole derivative) and 2 parts of sulfur were uniformly mixed into a rubber composition by a Banbury mixer. Table 1 also shows the properties of the rubber composition and the characteristics of the tire prepared.

The rubber composition of Comparative Example 7 listed in Table 1 is a control prepared using as the polymer SBR 1502 (product of Japan Synthetic Rubber Co., Ltd.) which is a kind of emulsion-polymerized SBR (E-SBR). The properties of carbon black (a) are shown in Table 2 in detail.

TABLE 1

|  | Ex. 1 | Com. Ex. 1 | 2 | 3 | 4 | 5 | 6 | Ex. 2 | Com. Ex. 7 |
|---|---|---|---|---|---|---|---|---|---|
| Rubber component No. | A | B | C | D | E | F | G | H | I |
| Vinyl content in BR (%) | 25 | 45 | — | 27 | 65 | 21 | 30 | 37 | — |
| Vinyl content in SBR (%) | 50 | 55 | — | 50 | 75 | 38 | 45 | 60 | — |
| Styrene content in SBR (%) | 45 | 30 | — | 43 | 32 | 55 | 8 | 36 | — |
| Vinyl content in copolymer (%) | 29 | 49 | 52 | 32 | 71 | 31 | 36 | 43 | 18 |
| Styrene content in copolymer (%) | 15 | 14 | 13 | 14 | 20 | 35 | 3 | 9 | 23.5 |
| Tg of copolymer (°C.) | −87 | −68 / −47 | −61 | −79 | −53 / −17 | −89 / −32 | −85 | −78 | −64 |
| Structure of copolymer | (1) | (2) | (3) | (1) | (1) | (1) | (1) | (1) | (3) |
| Coupling efficiency (%) | 51 | 53 | 45 | 25 | 48 | 51 | 52 | 45 | 0 |
| Carbon black (a) | 55 | 55 | 55 | 55 | 55 | 55 | 55 | 55 | 55 |
| Oil | 20 | 20 | 20 | 20 | 20 | 20 | 20 | 20 | 20 |
| Pico abrasion index | 115 | 88 | 97 | 101 | 84 | 102 | 117 | 107 | 100 |
| Tire RR | 74 | 85 | 83 | 86 | 89 | 87 | 74 | 74 | 100 |
| Tire wet μ | 106 | 106 | 103 | 107 | 112 | 110 | 91 | 108 | 100 |

Note:
(1) B R terminal
(2) S B R terminal
(3) random

Table 1 reveals that the compositions of Examples 1 and 2 are superior to the control in any of Pico abrasion resistance index, RR and wet μ. The composition of Comparative Example 1 wherein the polymer as coupled has an SBR terminal is small in Pico abrasion resistance index. Comparative Example 2 in which a random copolymer is used is also small in Pico abrasion resistance index. Comparative Example 3, in which the coupling efficiency is as low as 25%, fails to afford fully improved RR. In Comparative Example 4, the BR portion, SBR portion and the whole copolymer are excessive in vinyl content, while Tg is above −60° C., hence poor abrasion resistance. In Comparative Example 5, the copolymer has an excessive styrene content in its entirety, and Tg is also above −60° C., hence insufficient RR and abrasion resistance. In Comparative Example 6, the SBR portion and the whole copolymer are too low in styrene content to result in small wet μ.

EXAMPLES 3-4 AND COMPARATIVE EXAMPLES 8-15

Rubber compositions were prepared in the same manner as in Example 1 with the exception of using the rubber components and the carbon components listed in Table 2. The properties of the compositions and the characteristics of the tires prepared using the compositions were similarly determined.

TABLE 2

|  | Ex. 3 | Ex. 4 | Com. Ex. 8 | 9 | 10 | 11 | 12 | 13 | 14 | 15 |
|---|---|---|---|---|---|---|---|---|---|---|
| Rubber component No. | A | A | A | A | A | A | A | A | A | C |
| Carbon black No. | a | b | c | d | e | f | g | a | a | c |
| $N_2SA$ | 82 | 90 | 93 | 70 | 90 | 82 | 90 | 82 | 82 | 93 |
| IA | 65 | 70 | 91 | 55 | 80 | 65 | 75 | 65 | 65 | 91 |
| CTAB | 79 | 87 | 91 | 69 | 88 | 80 | 82 | 79 | 79 | 91 |
| 24 $M_4$ · DBP | 96 | 95 | 102 | 95 | 100 | 98 | 105 | 96 | 96 | 102 |
| Tint | 91 | 90 | 109 | 90 | 90 | 116 | 95 | 91 | 91 | 109 |
| $N_2SA$-IA | 17 | 20 | 2 | 15 | 10 | 17 | 15 | 17 | 17 | 2 |
| $N_2SA$-CTAB | 3 | 3 | 2 | 1 | 2 | 2 | 8 | 3 | 3 | 2 |

TABLE 2-continued

|  | Ex. | | Com. Ex. | | | | | | | |
|---|---|---|---|---|---|---|---|---|---|---|
|  | 3 | 4 | 8 | 9 | 10 | 11 | 12 | 13 | 14 | 15 |
| ΔTint | −6 | −12 | 6 | −1 | −11 | 19 | 0 | −6 | −6 | 6 |
| Carbon component | 45 | 55 | 55 | 55 | 55 | 55 | 55 | 30 | 120 | 55 |
| Oil | 5 | 20 | 20 | 20 | 20 | 20 | 20 | 5 | 95 | 20 |
| Pico abrasion index | 112 | 122 | 117 | 93 | 113 | 125 | 116 | 82 | 85 | 104 |
| Tire RR | 68 | 72 | 91 | 81 | 82 | 96 | 81 | 71 | 125 | 94 |
| Tire wet μ | 102 | 104 | 105 | 99 | 90 | 108 | 95 | 88 | 113 | 104 |

Table 2 reveals that the compositions of Examples 3 and 4 are superior to the control in every respect and have good balance between the properties. Comparative Example 8 is small in the value (N₂SA-IA) and great in Δtint and is therefore less improved than Examples 3 and 4 in RR. Comparative Example 9 is small in N₂SA, great in Δtint and therefore insufficient in abrasion resistance. Comparative Example 10 is small in the value (N₂SA-IA) and has poor balance between RR and wet μ. Comparative Example 11 is great in tint and also in Δtint, consequently failing to achieve fully improved RR. Comparative Example 12 is great in the value (N₂SA-CTAB), as well as in Δtint, and accordingly has poor balance between RR and wet μ. In Comparative Examples 13 and 14, the amount of carbon component is outside the specified range, leading to poor abrasion resistance, while Comparative Example 13 is also small in wet μ. In Comparative Example 15, the rubber component and the carbon component are other than those specified for the invention, failing to afford fully improved RR.

EXAMPLES 5–7 AND COMPARATIVE EXAMPLE 16

Rubber compositions were prepared in the same manner as in Example 1 with the exception of using the rubber components and the carbon component listed in Table 3. The properties of the compositions and the characteristics of the tires prepared were similarly determined.

TABLE 3

|  | Ex. | | | Com. |
|---|---|---|---|---|
|  | 5 | 6 | 7 | Ex. 16 |
| Rubber component (A) | 60 | 35 | 40 | 15 |
| NR | 40 | 40 |  |  |
| SBR 1502 |  | 25 | 60 | 85 |
| Carbon black (a) | 65 | 65 | 65 | 65 |
| Oil | 30 | 30 | 30 | 30 |
| Pico abrasion index | 108 | 104 | 109 | 102 |
| Tire RR | 83 | 87 | 91 | 104 |
| Tire wet μ | 109 | 110 | 112 | 113 |

Table 3 reveals that Example 5 to 7 are superior to the control in any of Pico abrasion resistance index, RR and wet μ, while Comparative Example 16 is great in RR.

We claim:

1. A rubber composition comprising 40 to 100 parts by weight of carbon black per 100 parts by weight of a rubber component,
   (a) the rubber composition being characterized in that the rubber component contains, in 100 parts by weight thereof, at least 20 parts by weight of a block copolymer prepared by solution polymerization and comprising one unit of butadiene rubber portion and one unit of random-copolymerized styrene-butadiene rubber portion, the butadiene rubber portion having a vinyl content of 15 to 50%, the styrene-butadiene rubber portion having a vinyl content of 20 to 70% and a styrene content of 30 to 60%, the block copolymer having in its entirety a vinyl content of 15 to 60% and a styrene content of 5 to 30%, at least 40% of the copolymer being coupled with a tin compound so that the coupled copolymer has a butadiene rubber terminal, the coupled copolymer having only a single Tg at a temperature of up to −60° C.,
   0 to 80 parts by weight of natural rubber, synthetic polyisoprene rubber, synthetic polybutadiene rubber, synthetic styrene-butadiene rubber, modified products of these rubbers, or mixtures thereof;
   (b) the rubber composition being further characterized in that the carbon black has a specific surface area value (N₂SA) within the range of 75 to 105 as determined by the nitrogen adsorption method and is at least 15 in the difference between N₂SA and the iodine adsorption value (IA) thereof, up to 5 in the difference between N₂SA and the specific surface area value (CTAB) thereof as determined by the cetyltrimethylammonium bromide adsorption method, 90 to 110 in tint strength and up to −3 in the measured tint strength minus the calculated tint strength (Δtint).

2. A rubber composition as defined in claim 1 wherein the block copolymer is contained in an amount of 35 to 100 parts by weight in 100 parts by weight of the rubber component.

3. A rubber composition as defined in claim 1 wherein 45 to 95% of the block copolymer is coupled with a tin compound.

4. A rubber composition as defined in claim 1 wherein 50 to 70% of the block copolymer is coupled with a tin compound.

5. A rubber composition as defined in claim 1 wherein the carbon black is contained in an amount of 45 to 85 parts by weight per 100 parts by weight of the rubber component.

* * * * *